(12) United States Patent
Kim et al.

(10) Patent No.: US 11,689,144 B2
(45) Date of Patent: Jun. 27, 2023

(54) POWER TRANSFORMING APPARATUS AND AIR CONDITIONER INCLUDING THE SAME

(71) Applicant: LG Electronics Inc., Seoul (KR)

(72) Inventors: Kyungmin Kim, Seoul (KR); Bohwan Seo, Seoul (KR); Seungjoo Lee, Seoul (KR); Jiyoun Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 17/542,015

(22) Filed: Dec. 3, 2021

(65) Prior Publication Data

US 2022/0345067 A1  Oct. 27, 2022

(30) Foreign Application Priority Data

Apr. 26, 2021 (KR) .......................... 10-2021-0053872

(51) Int. Cl.
*H02P 29/024* (2016.01)
*F24F 11/88* (2018.01)
(Continued)

(52) U.S. Cl.
CPC ........ *H02P 29/024* (2013.01); *F16C 32/0451* (2013.01); *F24F 11/88* (2018.01); *H02M 3/33573* (2021.05); *H02P 27/08* (2013.01)

(58) Field of Classification Search
CPC ...... H02P 29/00; H02P 29/024; H02P 29/025; H02P 29/028; H02P 27/00; H02P 27/04;
(Continued)

(56) References Cited

U.S. PATENT DOCUMENTS 5,574,345 A * 11/1996 Yoneta .................. F04D 19/048
310/90.5
5,917,297 A    6/1999 Gerster et al.
(Continued)

FOREIGN PATENT DOCUMENTS

EP          0430009        6/1991
JP          2001082472     3/2001
(Continued)

OTHER PUBLICATIONS

Extended European Search Report in European Appln. No. 22157706.7, dated Aug. 19, 2022, 13 pages.
(Continued)

*Primary Examiner* — Antony M Paul
(74) *Attorney, Agent, or Firm* — Fish & Richardson P.C.

(57) ABSTRACT

A power transforming apparatus for supplying power to a motor having a magnetic bearing includes: a converter configured to, in an initial operation, receive AC power, and an auxiliary circuit performing initial charging by rectifying the AC power to a second power and supplying the rectified second power to an inverter controller and a magnetic bearing controller. The inverter controller outputs a signal to an inverter using the second power and controls the inverter to supply a rectified DC voltage to the converter, and the converter is configured to, during a normal operation, stop supplying the second power to the inverter controller and control the rectified DC voltage to be supplied to the inverter controller and the magnetic bearing controller, and, based on a power failure being detected, outputs a control signal such that the second power is supplied to the inverter controller and the magnetic bearing controller.

20 Claims, 10 Drawing Sheets

(51) Int. Cl.
*H02M 3/335* (2006.01)
*F16C 32/04* (2006.01)
*H02P 27/08* (2006.01)

(58) Field of Classification Search
CPC .. H02P 27/06; H02P 27/08; H02P 9/32; H02P 23/26; H02P 25/00; H02P 25/022; H02P 25/062; H02P 25/064; H02P 6/00; H02P 6/12; H02P 1/00; H02P 1/16; H02P 1/24; H02P 1/26; H02P 1/46; H02P 3/14; F16C 32/0451
See application file for complete search history.

(56) References Cited

U.S. PATENT DOCUMENTS

| | | | |
|---|---|---|---|
| 6,617,734 | B2 | 9/2003 | Taniguchi et al. |
| 7,116,066 | B2 | 10/2006 | Lin |
| 2020/0287471 | A1 | 9/2020 | Huang et al. |

FOREIGN PATENT DOCUMENTS

| | | |
|---|---|---|
| JP | 3771200 | 4/2006 |
| KR | 20180093341 | 8/2018 |
| WO | WO2018234226 | 12/2018 |

OTHER PUBLICATIONS

Liu & Mao, "A Novel Power Failure Compensation Control Method for Active Magnetic Bearings Used in High-Speed Permanent Magnet Motor," IEEE Transactions on Power Electronics, Aug. 2015, (6):4565-4675.

Office Action in Korean Appln. No. 10-2021-0053872, dated Aug. 22, 2022, 17 pages (with English translation).

Wang et al., "Average power balance method for power failure compensation control of high-speed turbo molecular pump with AMB system," IET Electric Power Applications, Feb. 2019, 13(2):190-197.

* cited by examiner

FIG. 8

POWER TRANSFORMING APPARATUS AND AIR CONDITIONER INCLUDING THE SAME

CROSS-REFERENCE TO RELATED APPLICATION

Pursuant to 35 U.S.C. § 119(a), this application claims the benefit of the earlier filing date and the right of priority to Korean Patent Application No. 10-2021-0053872, filed on Apr. 26, 2021, the contents of which is incorporated by reference herein in its entirety.

TECHNICAL FIELD

The present disclosure relates to a power transforming apparatus and an air conditioner including the same, and more particularly, to a power transforming apparatus capable of stably supplying power to a motor employing a magnetic bearing and an air conditioner including the same.

BACKGROUND

In general, a compressor of an air conditioner uses an electric motor (or motor) as a driving source. A motor generally has a structure in which a rotating shaft located inside a stator is supported by a bearing in a physical contact manner. Recently, in response to the need to develop a high-speed rotation motor in which a rotating shaft is supported by a magnetic bearing even without a physical contact. Such a motor employing a magnetic bearing receives power through a power transforming apparatus.

It is generally known that the power transforming apparatus includes a rectifier, a power factor controller, and an inverter type power transforming unit. Specifically, an AC commercial voltage output from a commercial power supply is rectified by the rectifier. The voltage rectified by the rectifier is supplied to the power transforming unit such as an inverter. In this case, the power transforming unit generates AC power for driving the motor by using the voltage output from the rectifier. Also, in some cases, a DC-DC converter for improving a power factor may be provided between the rectifier and the inverter.

On the other hand, in the power transforming apparatus and an air conditioner, power supply is essential to maintain a role of a magnetic bearing even in the event of a power failure. In general, an uninterruptible power supply (UPS) is used in a power transforming apparatus to maintain the role of the magnetic bearing even in the event of the power failure.

An uninterruptible power supply (UPS) refers to a device that instantly supplies alternative power when power supply becomes impossible due to a power outage or the like. Such an UPS is expensive and requires maintenance because it has a built-in battery. Also, the UPS has a disadvantage that an operating temperature is limited.

In addition, the power transforming apparatus and the air conditioner require a backup bearing to protect a magnetic bearing coil in the event of a failure or unstable control of the magnetic bearing. The backup bearing is designed to withstand friction and speed in an instantaneous transient state. The backup bearing may be damaged or its lifespan may be reduced if a power outage or failure occurs during high-speed rotation, and in severe cases, even product damage may be caused. In general, the lifespan of the backup bearing is less than about 10 to 100 cycles. When a fault occurs in the backup bearing, the operation of the product is stopped, and maintenance costs due to replacement are required.

On the other hand, the prior art patent document U.S. Pat. No. 7,116,066 (hereinafter, Patent Document 1) discloses performing a regeneration by performing a hysteresis voltage control when a power failure occurs.

However, according to Patent Document 1, when a converter fails during a normal operation, the regenerative voltage control cannot be performed. That is, there is a problem that an operation in response to the power failure cannot be performed. In addition, an accurate voltage control is difficult during the regenerative voltage control.

Another prior art patent document U.S. Pat. No. 6,617,734 (hereinafter, Patent Document 2) discloses supplying power to an inverter and a magnetic bearing controller by using a separate regenerative circuit upon a power failure. However, even in Patent Document 2, it is impossible to deal with a case where a converter fails during a normal operation and an accurate voltage control is difficult during the regenerative voltage control, similar to Patent Document 1. In order to solve these problems, separate additional circuits, such as a power failure and speed detection circuit, a regenerative circuit, and the like, should be configured.

Figure 1:
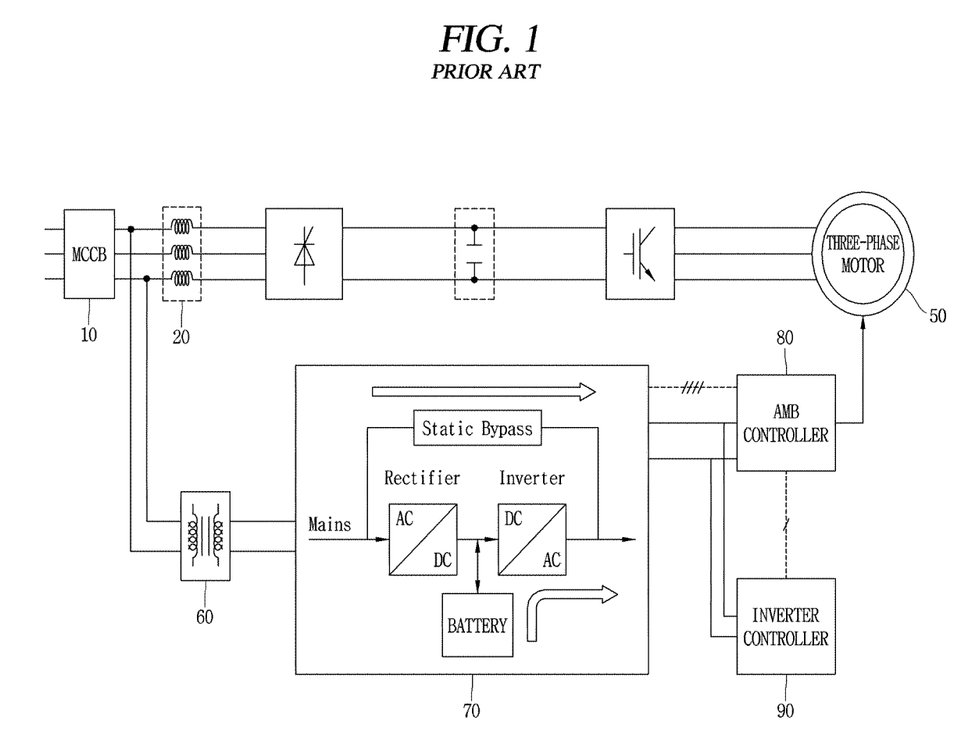
FIG. 1 is an exemplary circuit diagram of a power transforming apparatus employing a magnetic bearing using a UPS device according to the related art.

FIG. 1 shows an example of a power transforming apparatus using a UPS device 70 according to the related art.

Explaining operations according to the related art with reference to FIG. 1, during a normal operation, an AC input voltage that is input to an MCCB 10 is output to an AMB controller 80 and an inverter controller 90 sequentially via a step-down transformer 60 and a static bypass of a UPS device 70. Thereafter, power is supplied to a three-phase motor 50 to which a magnetic bearing is applied. On the other hand, upon a power failure, a DC voltage charged in a battery embedded in the UPS device 70 is converted into AC power through an AC/DC rectifier and a DC/AC inverter, and then power is supplied to the AMB controller 80.

Accordingly, as described above, in addition to the problem of an increase in product price due to an increase in material costs, maintenance costs are additionally needed depending on the lifespan of the battery. Even a limited operating temperature makes an exterior application of the power transforming apparatus difficult.

SUMMARY

Therefore, an aspect of the present disclosure is to provide a power transforming apparatus that is capable of stably supplying power even upon a power failure and does not cause maintenance costs due to an addition of a battery, and an air conditioner having the same. Another aspect of the present disclosure is to provide a power transforming apparatus that is capable of stably supplying power to a magnetic bearing controller even upon a power failure, and is allowed for outdoor installation without a limit in an operating temperature so as to be applicable to an air-cooled air conditioner, and an air conditioner including the same.

In order to achieve these and other advantages and in accordance with one implementation of the present disclosure, as embodied and broadly described herein, there is provided a power transforming apparatus that may supply power to a magnetic bearing-applied motor and include an inverter and a converter. Upon an initial operation, the converter may receive an AC voltage as first power and an auxiliary circuit may perform initial charging using the first power. The auxiliary circuit may supply rectified second power to an inverter controller and a magnetic bearing controller connected to the converter. Accordingly, the inverter controller may output a driving signal to the inverter using the second power so as to perform an initial charging operation. Thereafter, the inverter controller may control the inverter to supply rectified DC voltage to the converter. After the initial charging, the converter may cut off the supply of the second power by the auxiliary circuit and supply the DC voltage supplied in response to the operation of the inverter to the inverter controller and the magnetic bearing controller. Meanwhile, since the power supply through the converter is not allowed during a power failure, the second power of the auxiliary circuit may be supplied to the inverter controller and the magnetic bearing controller again such that a magnetic bearing gap control can be stably performed.

In an implementation, the power transforming apparatus may further include a step-down transformer to step down a three-phase input voltage to supply to the converter and the auxiliary circuit.

In an implementation, the step-down transformer may be respectively connected to the converter and the auxiliary circuit through power lines as a separated branched Tap.

In an implementation, the step-down transformer may supply a stepped-down AC voltage to the converter through a first branch line and supply the stepped-down AC voltage to the auxiliary circuit through a second branch line upon an initial operation.

In an implementation, the step-down transformer may include a circuit structure in which an output voltage ratio of 380V:220V satisfies at least 1:2.

In an implementation, the power transforming apparatus may further include a relay located between the converter and the auxiliary circuit so as to be turned on or off by the converter.

In an implementation, the converter may turn off the relay to cut off the supply of the second power during the normal operation, and output a control signal for turning on the relay to supply the second power again upon the power failure.

In an implementation, the converter may detect the power failure and transmit a power failure detection signal to the inverter controller and the magnetic bearing controller.

In an implementation, when the power failure detection signal is received, the inverter controller may block a thyristor (SCR) of a rectifier connected to the inverter.

In an implementation, the inverter controller may switch a control mode of the inverter from a speed control mode into a voltage control mode when a reverse rotation of the motor is started after receiving the power failure detection signal.

In an implementation, the rectifier may control initial charging and a power factor of an AC input voltage of the inverter during the normal operation.

In an implementation, the rectifier may be operated to suppress a regenerative reverse voltage, in response to the inverter controller blocking the thyristor (SCR).

In an implementation, the magnetic bearing controller may perform a magnetic bearing gap control by receiving the second power from the auxiliary circuit and applying a current to the magnetic bearing applied to the motor, upon the power failure.

In an implementation, the magnetic bearing controller may perform the magnetic bearing gap control using the rectified DC voltage supplied from the converter during the normal operation.

In an implementation, the converter may change an output thereof into an OFF state and the inverter and the magnetic bearing controller may generate control power by receiving the second power from the auxiliary circuit when a converter fault signal is detected.

Each of those implementations may also be applicable to an air conditioner including the power transforming apparatus.

Hereinafter, effects of a power transforming apparatus and an air conditioner including the same according to the present invention will be described.

In a power transforming apparatus including a magnetic bearing-applied motor and an air conditioner including the same according to at least one of implementations of the present disclosure, an effective response to a power failure can be allowed by applying regenerative stepping-up and a DC/DC converter without an additional UPS device.

In addition, the present disclosure may have an advantage in that it is unnecessary to implement a separate power failure detection circuit for regenerative control or an additional circuit for regeneration without adding a UPS device. Furthermore, an accurate regenerative constant voltage control can be performed even without an additional circuit for regeneration.

In addition, the present disclosure can improve reactive power due to a lowered power factor of an AC control power of a magnetic bearing. Specifically, by supplying power in a DC form through a DC/DC converter, only active power can be supplied.

Also, in the power transforming apparatus including the magnetic bearing-applied motor and the air conditioner including the same according to the present disclosure, since the UPS device can be excluded, battery replacement costs cannot be required and even an external application can be allowed.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

DETAILED DESCRIPTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 2:
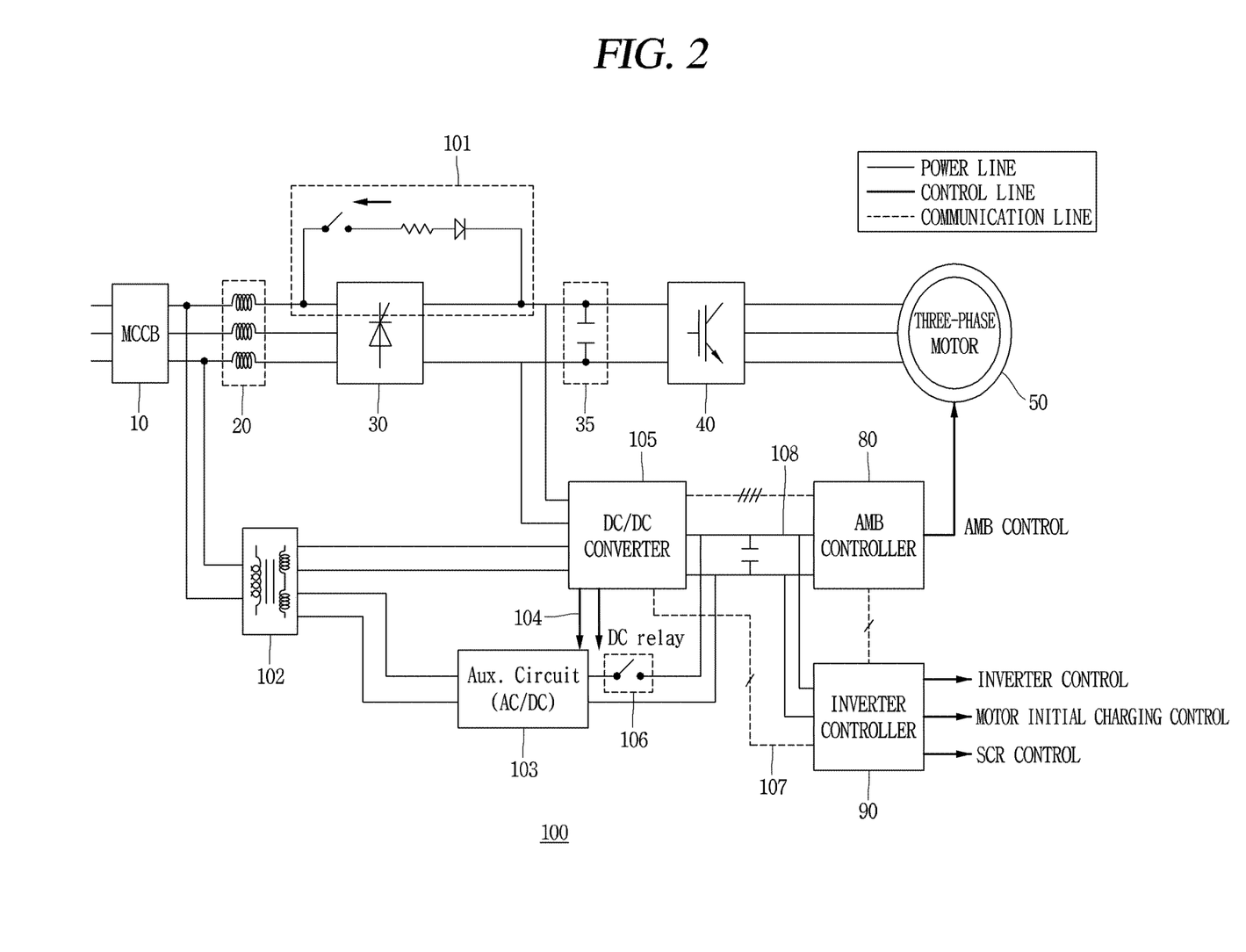
FIG. 2 is a representative circuit diagram of a power transforming apparatus employing a magnetic bearing without a UPS device according to the present disclosure.

FIG. 2 is a representative circuit diagram of a power transforming apparatus employing a magnetic bearing without a UPS device according to the present disclosure.

A power transforming apparatus 100 according to the present disclosure may include a three-phase rectifier 30, a DC link capacitor 35, a three-phase inverter 40, a step-down transformer 102, an auxiliary circuit 103, and a DC/DC converter 106, a magnetic bearing controller 80, and an inverter controller 90, and may be connected to an MCCB 10 for supplying an AC voltage and a three-phase motor 50 to which a magnetic bearing is applied.

In the power transforming apparatus 100 according to the present disclosure, upon an initial operation, a three-phase AC voltage input to the MCCB 10 may be supplied to the DC/DC converter 105 via the step-down transformer 102.

In the present disclosure, the step-down transformer 102 may be implemented to have a structure in which an output voltage ratio of 380V:220V satisfies 1:2. Specifically, the step-down transformer 102 may supply an AC voltage for an inverter/magnetic bearing control with an upper controller (cycle control) by stepping down a line voltage (R, T phase) of three-phase power to 220V.

The step-down transformer 102 may supply control power to the DC/DC converter 105 through a separated branched Tap for an initial operation. This may be distinguished from a structure in which the step-down transformer 60 (FIG. 1) of the related art power transforming apparatus is connected to the UPS device 70 through a single output structure (about 500VA to 3000VA).

The step-down transformer 102 may thus require a very small (low) output ratio (e.g., 1:9) for initial control power of the DC/DC converter 105 by virtue of the structure of the separated branched Tap.

Therefore, during the initial control of the DC/DC converter 105, AC power (220V) input from the step-down transformer 102 may be used. After the initial charging operation of the three-phase converter 40 is completed, power may be changed to a DC voltage of the DC capacitor 35 of an inverter side according to a potential difference between voltages of the DC/DC converter 105 and the three-phase inverter 40.

Although not shown, in another example, the step-down transformer 102 may have a structure in which a separate external step-down transformer is further applied together with the step-down transformer 60 of FIG. 1.

The three-phase rectifier 30 may receive three-phase AC power passed through the reactor 20, convert the three-phase AC power into DC power, and supply the DC power to the three-phase inverter 40.

The three-phase rectifier 30 may have a structure of a half-wave phase-controlled rectifier including a thyristor (SCR, silicon-controlled rectifier) at an upper end thereof.

During a normal operation, the three-phase rectifier 30 may serve to control the initial charging and an AC input power factor of the three-phase inverter 40. In addition, in case of a power failure (power outage, power interruption), the three-phase rectifier 30 may serve as a breaker for blocking a three-phase AC power input from a motor regenerative voltage control, in order to prevent a regenerative reverse voltage.

The three-phase inverter 40 may include six power switching elements (IGBTs) and a gate drive circuit for driving the IGBTs.

The IGBT is a switching element having a structure of a power MOSFET (metal oxide semi-conductor field effect transistor) and a bipolar transistor, and has advantages of low driving power, high-speed switching, high voltage characteristics, and high current density.

The three-phase inverter 40 may rotate the three-phase motor 50 of a compressor by changing a DC voltage to an AC voltage through a voltage-type inverter during a normal operation. In addition, in the event of a power failure, the three-phase inverter 40 may operate as a three-phase PWM step-up converter in order to step up a generation voltage of the three-phase motor 50 which rotates in reverse by a pressure difference of the compressor. At this time, a voltage controlled by the three-phase inverter 40 should be greater than a counter electromotive voltage of the three-phase motor 50.

The DC/DC converter 105 may supply DC power to the inverter controller 90 and the magnetic bearing controller 80 through power lines 108 during a normal operation.

The DC/DC converter 105 may perform a power failure detection function. When a power failure is detected, the DC/DC converter 105 may provide a power failure detection signal to the inverter controller 90 and the magnetic bearing controller 80 through communication lines 107.

The DC/DC converter 105 may also constantly control a ratio of an output DC voltage to an input DC voltage. The DC/DC converter 105 may include a converter controller (not shown).

The auxiliary circuit 103 may initially supply power to the magnetic bearing controller 80 and the inverter controller 90 by performing AC/DC rectification.

The auxiliary circuit 103 may increase an output voltage during a normal operation after initial charging, and cut off a power supply in response to a turn-off of a DC relay 106.

The auxiliary circuit 103 may supply power to the magnetic bearing controller 80 and the inverter controller 90, in response to a turn-on of the DC relay 106 when a fault (breakdown, failure) of the DC/DC converter 105 is detected. That is, mode switching may be allowed upon the fault of the DC/DC converter 105.

The ON/OFF control of the DC relay 106 may be performed by a converter controller of the DC/DC converter 105.

The auxiliary circuit 103 may include an NTC or a fixed resistor for limiting (or removing) an inrush current that is generated due to a difference between output voltages during the initial charging and the mode switching. Accordingly, a stable power supply to the magnetic bearing controller 80 and the inverter controller 90 can be achieved without a transient state. This will be described in more detail later with reference to FIG. 6.

The magnetic bearing controller 80 may serve to lift a shaft of the three-phase motor 50 by applying a current to a magnetic bearing applied to the three-phase motor 50.

Although not shown in detail, the magnetic bearing (AMB) controller 80 may include a control board, a current amplifier, and a power supply (SMPS).

The inverter controller 90 may output a PWM for driving the thyristor (SCR) of the three-phase rectifier 30 and the IGBT of the inverter 40 during a normal operation. Accordingly, a speed control for variably controlling the three-phase motor 50 at a desired speed may be performed.

Also, the inverter controller 90 may control an initial charging circuit 101 for the initial charging of the three-phase motor 50. In addition, the inverter controller 90 may control the inverter 40 to operate as a step-up converter, in response to a power failure detection signal being input from the DC/DC converter 105 upon a power failure.

Figure 3:
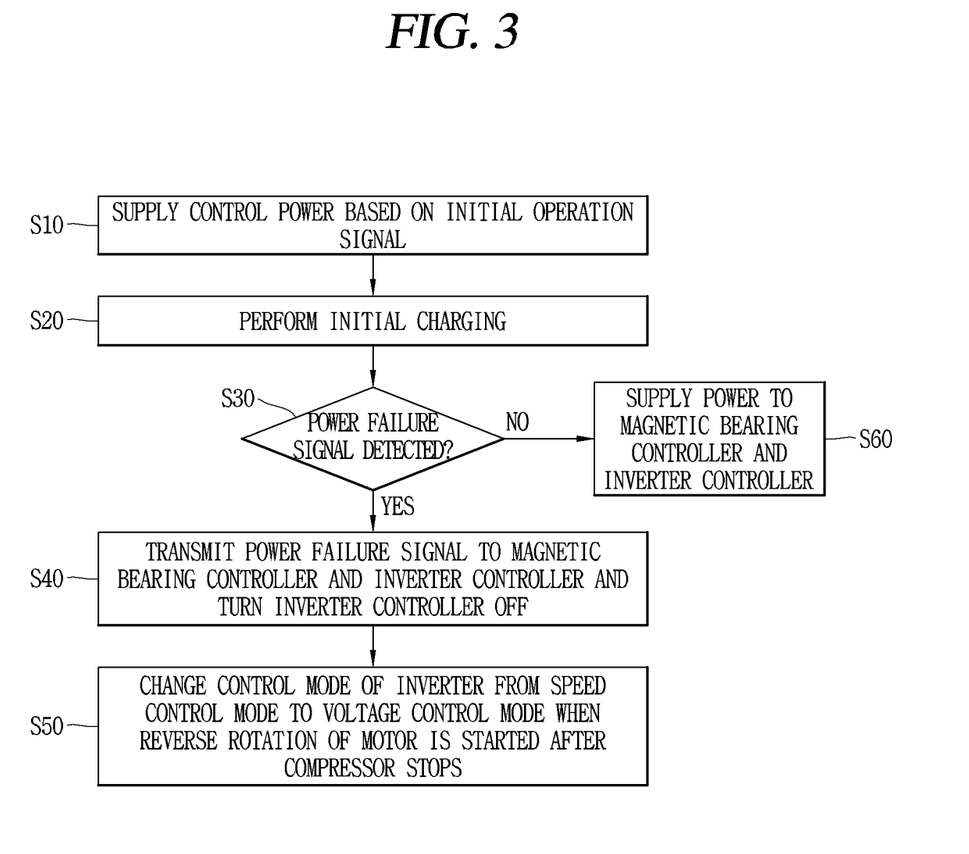
FIG. 3 is a flowchart illustrating an operation responsive to a power failure in a power transforming apparatus employing a magnetic bearing without a UPS device according to the present disclosure.

Hereinafter, FIG. 3 is a flowchart illustrating operations responsive to a power failure in a power transforming apparatus employing a magnetic bearing without a UPS device according to the present disclosure.

As illustrated in FIGS. 2 and 3, a method of operating a power transforming apparatus according to the present disclosure may start with an operation of supplying control power based on an initial driving signal (S10).

In detail, operations of the power transforming apparatus 100 will be described with reference to FIG. 2. A three-phase AC voltage that is input to the MCCB 10 may be supplied to the DC/DC converter 105 via the step-down transformer 102. Then, in response to an AC relay ON signal, an AC/DC rectification may be executed for the three-phase AC voltage input to the auxiliary circuit 103, such that power can be supplied to the magnetic bearing controller 80 and the inverter controller 90.

When power is supplied to the inverter controller 90, an initial charging operation may be performed by the three-phase inverter supplied with the three-phase power (S20).

Specifically, in FIG. 2, a relay for an initial charging of three-phase power may be driven by the inverter controller 90. The inverter controller 90 may output a trigger signal to the thyristor (SCR) of the three-phase rectifier 30. Then, the three-phase rectifier 30 may supply DC power to the DC link capacitor 35. Thereafter, power charged in the DC link capacitor 35 may be supplied to the DC/DC converter 105 as input power and control power (Normal operation).

Next, a power failure detection signal may be detected during a normal operation (S30). The detection of the power failure detection signal may be performed by the DC/DC converter 105 (more specifically, the converter controller (not shown)) without a separate detection circuit.

When the power failure detection signal is detected, the DC/DC converter 105 may transmit the power failure detection signal to the magnetic bearing controller 80 and the inverter controller 90, and control a relay of the inverter controller 90 to be turned off (S40). In addition, the inverter controller 90 may block the thyristor (SCR) of the three-phase rectifier 30.

Thereafter, when the reverse rotation of the motor starts after the compressor stops, the inverter may be operated by switching a control mode of the inverter from a speed control mode to a voltage control mode (S50).

Specifically, when the compressor stops, a direction of pressure may be changed and the motor may rotate in a reverse direction. The control mode of the three-phase inverter 40 may be switched immediately when the motor rotates in the reverse direction. Specifically, the three-phase inverter 40 may be switched from the speed control mode to the voltage control mode.

When switched to the voltage control mode, the three-phase inverter 40 may perform a regenerative constant voltage control using the IGBT of the three-phase inverter 40 and position estimation information of a sensorless algorithm of the inverter controller 90.

Specifically, when the reverse rotation of the motor 50 is caused due to the pressure difference of the compressor after an occurrence of the power failure, the three-phase inverter 40 may perform the regenerative constant voltage control by using phase angle information obtained through a sensorless control logic of the three-phase converter 40.

During the regenerative constant voltage control, the magnetic bearing controller 80 and the inverter controller 90 may use a relatively very small quantity of power compared to a large-capacity inverter. Accordingly, upon the regenerative constant voltage control, a stepping-up operation may be performed by using a phase inductance of the motor 50, the IGBT of the inverter 40, and the DC link capacitor 35 located between the three-phase rectifier 30 and the inverter 40, without a separate auxiliary circuit.

In this regenerative constant voltage control, the stepping-up operation should be performed with a voltage greater than a counter electromotive force of the motor 50. That is, the motor 50 should be able to supply power to the magnetic bearing controller 80 by stably performing the step-up control in a range of 15 to 20 Hz. Here, the range of 15 to 20 Hz may mean the minimum speed level for protecting a backup bearing.

As described above, a stable power supply suitable for the input spec of the DC/DC converter 105 can be achieved, even during the power failure, through the power failure detection by the converter 105, the operation of the inverter controller 90, and the regenerative constant voltage control.

On the other hand, while the power failure detection signal is not detected according to the determination in step S30, namely, during the normal operation, input power may be supplied from the DC/DC converter 105 (more specifically, the converter controller) to the magnetic bearing controller 80 and the inverter controller 90.

Figure 4:
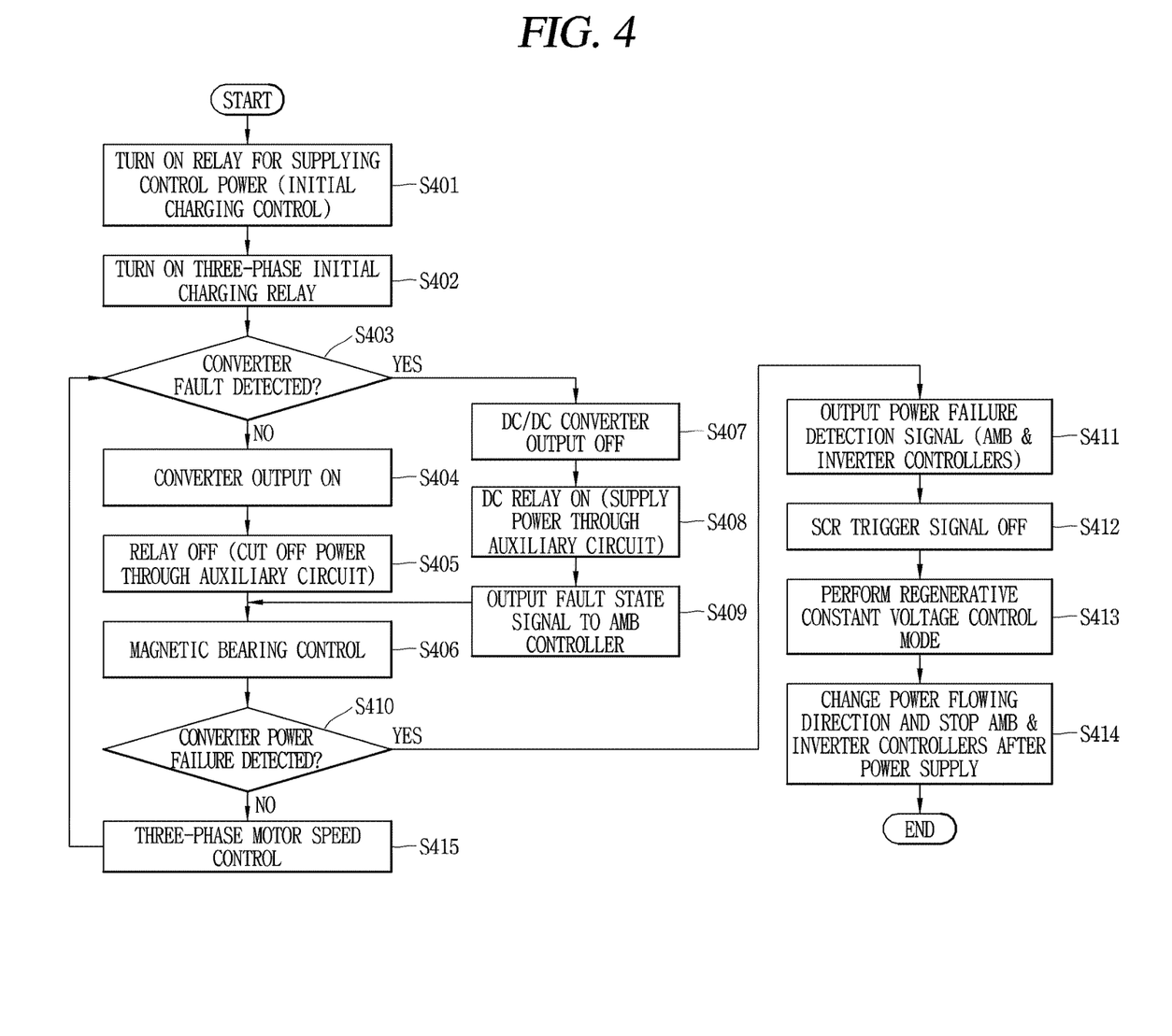
FIG. 4 is a flowchart illustrating operations carried out when a failure of a converter and/or a power failure occurs in a power transforming apparatus according to the present disclosure.

FIG. 4 is a flowchart illustrating operations carried out when a fault of a converter and/or a power failure occurs in a power transforming apparatus according to the present disclosure.

The power transforming apparatus according to the present disclosure may mainly include four operations. Specifically, the power transforming apparatus may perform those operations including 1) an initial operation, 2) a normal operation when power is normally supplied, 3) a response operation when a fault of the DC/DC converter occurs (steps S407 to S409), and 4) a response operation when a power failure of the DC/DC converter occurs (step S410 to S414).

First, a description will be given of 1) an initial operation (steps S401 and S402).

An AC relay may be turned on to supply control power to a motor to which a magnetic bearing is applied (S401).

Specifically, in FIG. 2, initial charging of the auxiliary circuit 103 may be performed with an AC voltage that is transferred to the auxiliary circuit 103 through a first branch line of the step-down transformer 102 (i.e., two power lines connected from the step-down transformer 102 to the auxiliary circuit 103). Accordingly, control power may be supplied to the DC/DC converter 105. In addition, power may be supplied to the DC/DC converter 105 through a second branch line of the step-down transformer 102 (i.e., two power lines connected from the step-down transformer 102 to the DC/DC converter 105).

Next, a relay for three-phase initial charging may be turned on (driven) by the inverter controller 90 (S402). Specifically, the relay in the initial charging circuit 101 may be turned on by the inverter controller 90, to perform initial charging for charging a DC voltage to the DC link capacitor 40 of the inverter 40. In addition, the inverter controller 90 may output a trigger signal (ON signal) to the thyristor of the three-phase rectifier 30.

Hereinafter, a description will be given of 2) a normal operation (steps S404 to S406, and S415).

As a result of the determination in step S403, when no converter fault (fault signal) is detected in the DC/DC converter 105, that is, during a normal operation, the converter 105 may be turned on (S404) and the relay 106 may be turned off, such that the output by the auxiliary circuit 103 can be turned off (S405). That is, the DC/DC converter 105 may supply power to the magnetic bearing controller 80 and the inverter controller 90. The magnetic bearing controller 80 may perform a magnetic bearing gap control (S406).

Hereinafter, a description will be given of 3) a response operation (steps S407 to S409) in case of a fault of the converter.

As a result of the determination in step S403, when a converter fault (fault signal) is detected in the DC/DC converter 105, the converter controller may change the output of the DC/DC converter 50 to an OFF state (S407).

Then, the converter controller may change the relay 106 from the OFF state to the ON state, such that power can be supplied through the auxiliary circuit 103 (S408). That is, power may be supplied through the auxiliary circuit 103 instead of the DC/DC converter 105.

At this time, the auxiliary circuit 103 may be switched to an AC/DC circuit using a thyristor switching element for power, and an inrush current may be suppressed by an NTC circuit. This will be described in more detail later with reference to FIG. 6.

The converter controller may notify the fault of the DC/DC converter 105 by outputting a fault signal to the magnetic bearing controller 80 (S409). Since the power supply is continued by the auxiliary circuit 103, the magnetic bearing controller 80 may perform a magnetic bearing gap control even at this time (S406).

Hereinafter, a description will be given of 4) a response operation (steps S410 to S414) in case of a power failure of the converter.

As a result of the determination in step S410, when an occurrence of a power failure is detected in the DC/DC converter 105, the DC/DC converter 105 may output a power failure detection signal to the magnetic bearing controller 80 and the inverter controller 90 (S411).

Then, the inverter controller 90 may output a control signal for blocking the thyristor SCR of the three-phase rectifier 30 in order to turn off the control of the inverter 40 (S412).

Then, the inverter controller 90 may perform a regenerative constant voltage control mode (S413). When the compressor is stopped as the inverter control is OFF, a direction that pressure is applied may change and thus the motor starts to rotate in reverse.

As soon as the motor starts to rotate in the reverse direction, the control mode of the inverter 40 may be switched from a speed control into a voltage control. The regenerative constant voltage control may be performed using the six switching elements (IGBTs) of the inverter 40 and position estimation information obtained through the sensorless algorithm of the inverter controller 90. Accordingly, a stable power supply that meets the input spec of the DC/DC converter 105 can be achieved even during the power failure.

As described above, in the power transforming apparatus to which the magnetic bearing is applied according to the present disclosure, the stable power supply can be achieved by the regenerative step-up control and the control of the converter, even without a UPS device, upon the occurrence of the fault or power failure of the converter.

Figure 5:
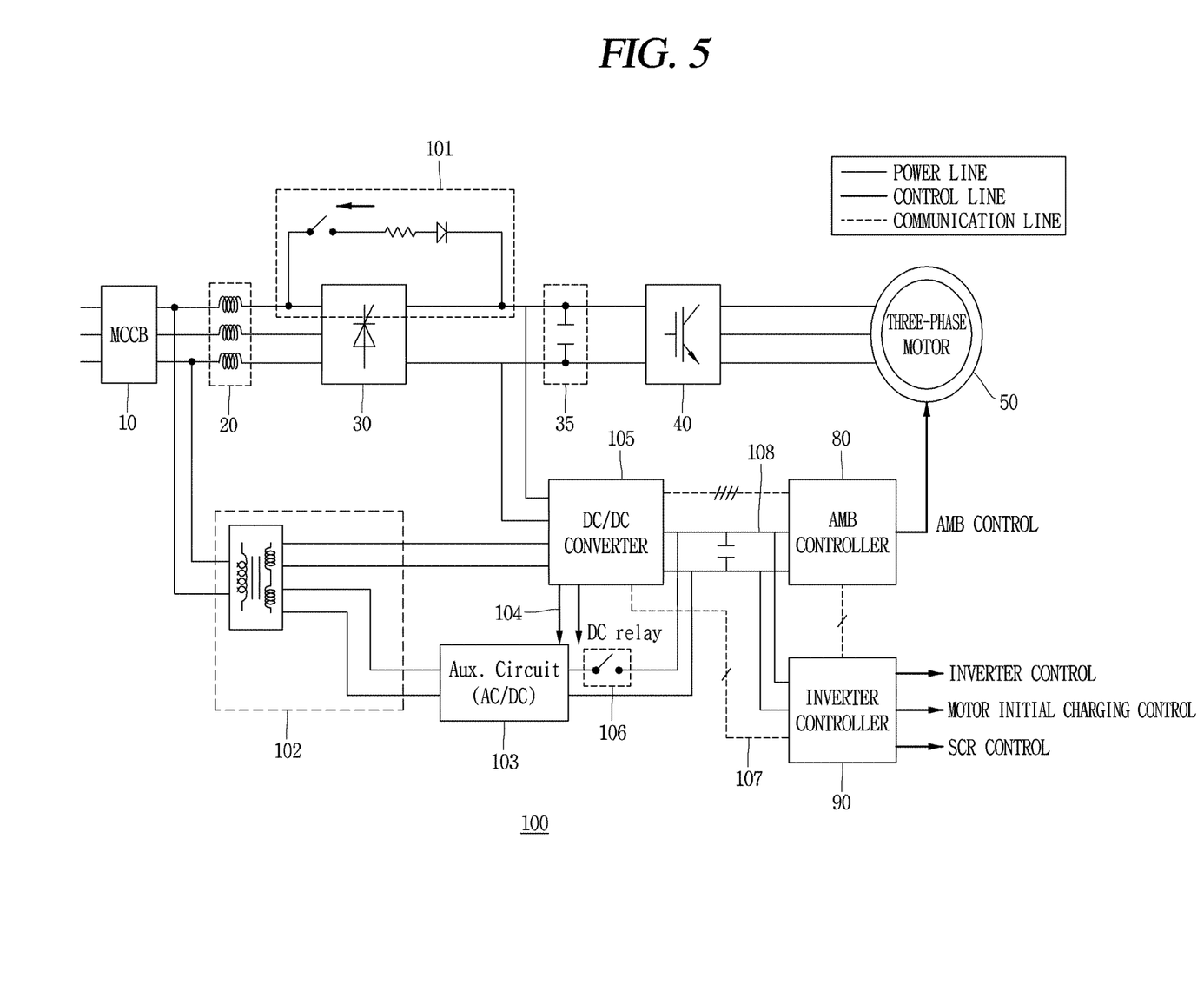
FIG. 5 is a circuit diagram illustrating an output structure of a step-down transformer for an initial operation in a power transforming apparatus according to the present disclosure.

FIG. 5 is a circuit diagram illustrating an output structure of a step-down transformer 102 for an initial operation in a power transforming apparatus according to the present disclosure.

As illustrated in FIG. 5, one end of the step-down transformer 102 may be connected to branch lines between the MCCB 10 and the reactor 20, and another end may be branched into two taps again. Specifically, the another end of the step-down transformer 102 may have a structure in which a first connection line is connected to the DC/DC converter 105 and a second connection line is connected to the auxiliary circuit 103.

In the present disclosure, the step-down transformer 102 may supply an AC voltage for controlling the inverter and the magnetic bearing by stepping down a line voltage (R, T phase) of the three-phase power supply to 220V. The AC voltage may have a very small (low) output ratio for initial control power (1:9) of the DC/DC converter 105.

Initially, AC power input from the step-down transformer 102 may be used as control power for the DC/DC converter 105. This may be about 220V. The initial control power of the DC/DC converter 105 may be supplied to the auxiliary circuit 103 through a third connection line 104, to be initially charged in the auxiliary circuit 103. To this end, the DC/DC converter 105 may be implemented as an insulation structure.

Afterwards, when the initial charging of the three-phase inverter 40 of about 380V is completed, the control power of the DC/DC converter 105 may be changed to a voltage (DC) of the DC link capacitor 35 of the three-phase inverter 40.

Figure 6:
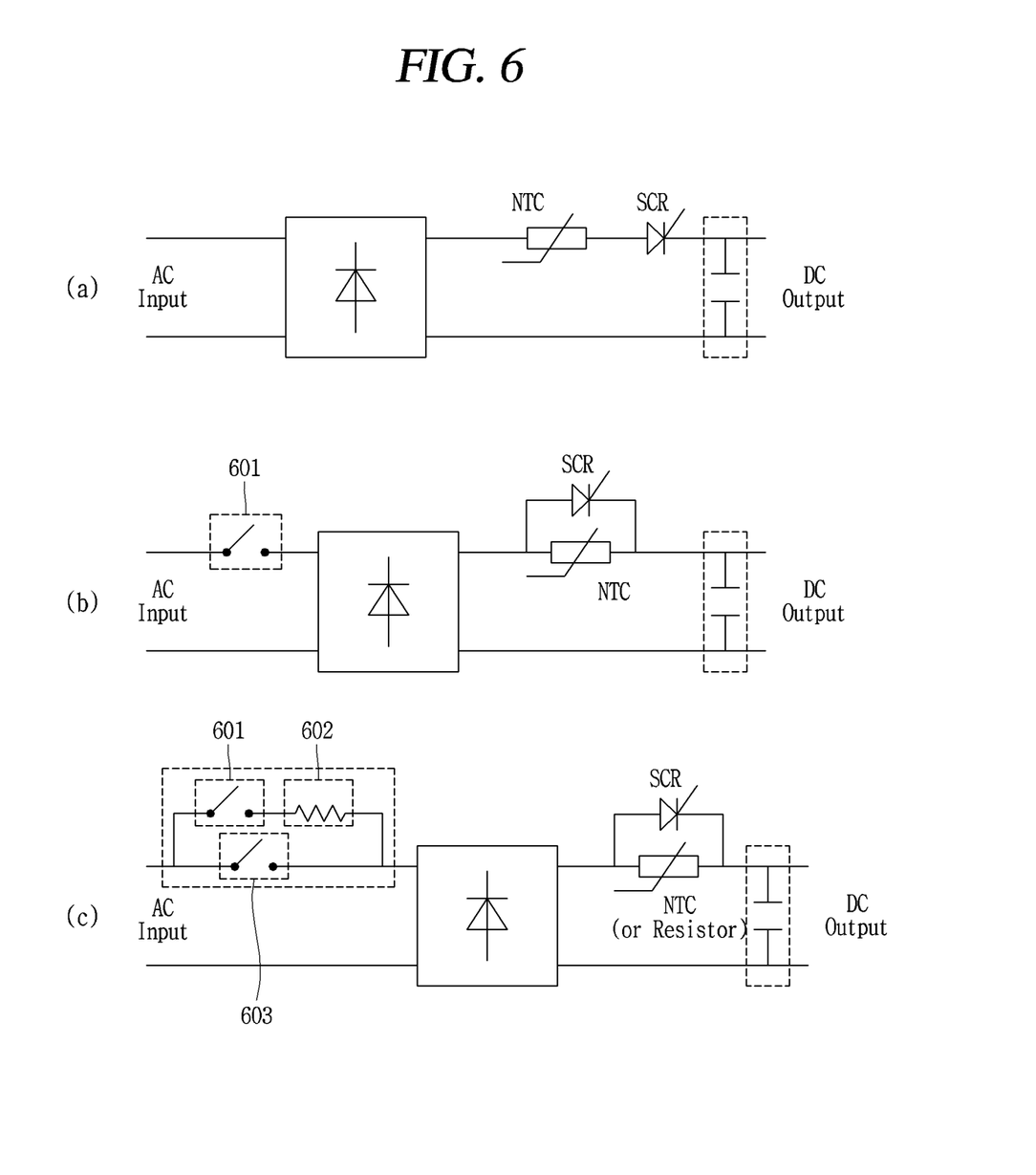
FIG. 6 is an exemplary circuit diagram illustrating of a circuit structure for initial charging and switching of an auxiliary circuit, in a power transforming apparatus according to the present disclosure.

FIG. 6 is an exemplary circuit diagram illustrating of a circuit structure for initial charging and switching of the auxiliary circuit connected with the step-down transformer 102, in the power transforming apparatus according to the present disclosure.

The power transforming apparatus according to the present disclosure may include the auxiliary circuit (AC/DC circuit) 103 for performing a response operation to the initial operation of the inverter 40 and the fault of the DC/DC converter 105.

The auxiliary circuit 103 may perform an initial charging operation using control power of the DC/DC converter 105 applied through the third connection line 104 (FIG. 5).

When the auxiliary circuit 103 is initially charged, power may be supplied to the inverter controller 90 such that the inverter controller 90 can supply the control power (SMPS)

for operating the inverter. Then, the inverter 40 may perform the initial charging operation by receiving three-phase power through the inverter controller 90, so as to charge the voltage to the DC link capacitor 35 and perform a preparation operation for driving the motor 50.

In addition, the auxiliary circuit 103 may perform a function for stably supplying power to the magnetic bearing controller 80 when the fault of the DC/DC converter 105 occurs.

Specifically, when a converter fault signal is detected, the converter controller may turn off the output of the DC/DC converter 105 and control a transfer switch (SCR or Relay) of the auxiliary circuit 103. Accordingly, a stable DC power supply to the magnetic bearing controller 80 can be continued.

The auxiliary circuit 103 according to the present disclosure may have an NTC (or resistor) or SCR structure to suppress an inrush current, which is generated due to a difference between an AC input voltage and a DC output voltage, when switching to an alternative operation due to a fault of the converter.

As illustrated in FIG. 6, the auxiliary circuit 103 may be mainly divided into a series structure (a) and parallel structures (b and c).

For example, the auxiliary circuit 103 may include a relay (DC Relay) instead of a thyristor (SCR). In addition, when implemented in the parallel structures (b and c), a fixed resistor may be applied instead of the NTC.

As illustrated in (a) of FIG. 6, when the auxiliary circuit 103 is implemented in the series structure, the NTC may be commonly used to limit (remove) an inrush current generated upon the initial charging and the operation mode switching. The thyristor (SCR) may also be used as a common switch for the initial charging and the operation mode switching.

When the auxiliary circuit 103 has the parallel structure as illustrated in (b) of FIG. 6, the NTC may be commonly used to limit (remove) an inrush current upon the initial charging and the operation mode switching. An AC relay 601 may also be used as a common switch for the initial charging and the operation mode switching. The thyristor SCR may be used for changing a current path to eliminate an occurrence of NTC loss.

When the auxiliary circuit 103 has the parallel structure as illustrated in (c) of FIG. 6, an initial charging resistor 602, an initial charging relay 601, and an AC power relay 603 may be applied to an input terminal upon the initial charging. In this structure, the NTC may be used only for limiting an inrush current upon the operation mode switching and the SCR may be used for changing a current path to eliminate NTC loss.

The NTC applied to the circuits of FIG. 6 may be difficult to be applied to a system having a high operating temperature. This is because an inrush current suppression performance is greatly reduced, which results from a great change in resistance value according to temperature. Therefore, the resistance value of the NTC should be set to an appropriate fixed resistance value that does not limit a maximum load current.

FIGS. 7A to 7D are various exemplary circuit diagrams illustrating an output structure of the DC/DC converter 105 in the power transforming apparatus according to the present disclosure.

In the present disclosure, the DC/DC converter 105 may have an insulation structure. The DC/DC converter 105 may supply power to the inverter controller 90 and the magnetic bearing controller 80 in an on-line manner during a normal operation. The DC/DC converter 105 may be used for supplying a regenerative voltage during a power failure.

The detection of the power failure may be performed by the DC/DC converter 105 without a separate additional circuit. Specifically, a generation of a power failure signal may be detected based on a DC voltage input to the converter 105 and an input voltage sensed by the auxiliary circuit 103.

Figure 7A:
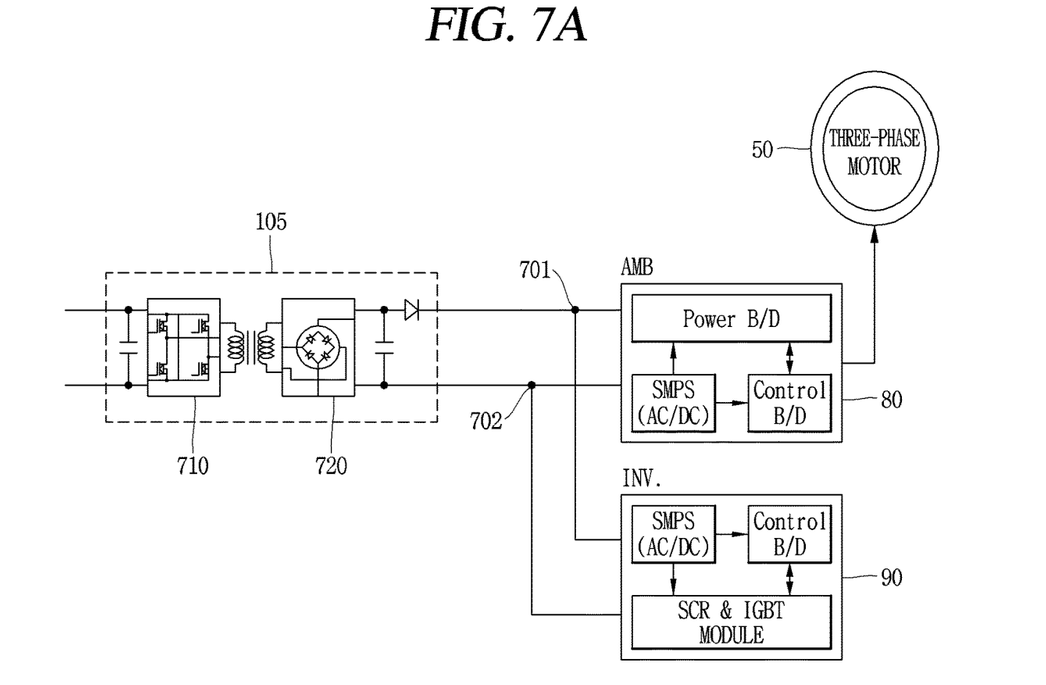
FIGS. 7A to 7D are various exemplary circuit diagrams illustrating an output structure of a DC/DC converter in a power transforming apparatus according to the present disclosure.
Figure 7B:
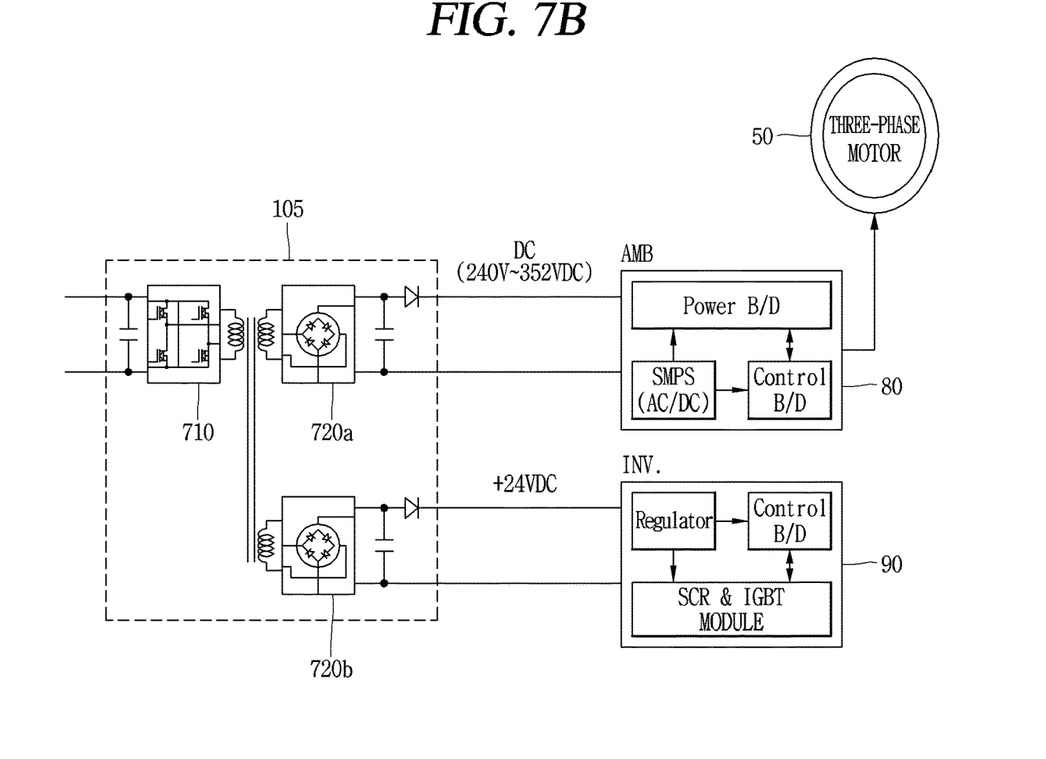
Figure 7C:
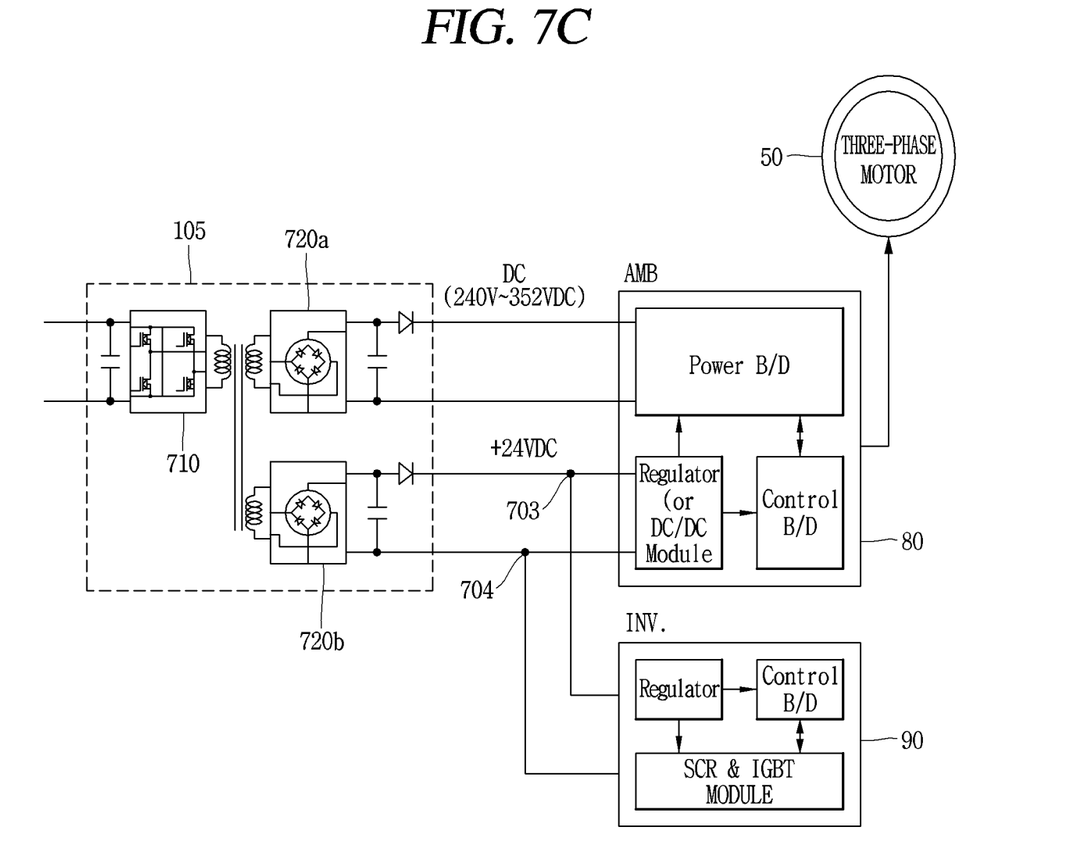
Figure 7D:
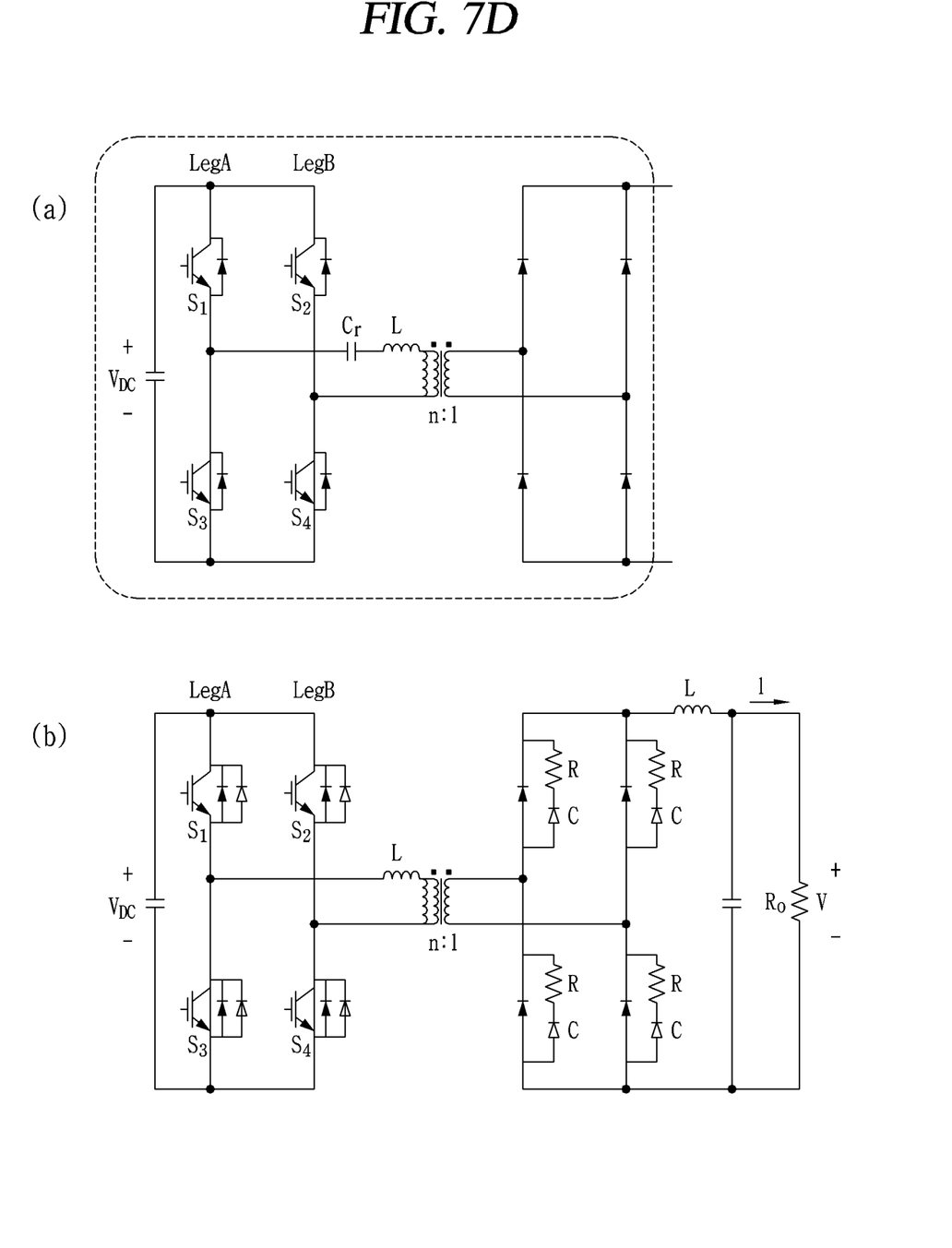

FIG. 7A illustrates a case in which the DC/DC converter 105 has a single output structure, FIGS. 7B and 7C illustrate a case in which the DC/DC converter 105 has a multi-output structure, and FIG. 7D illustrates a case in which the DC/DC converter 105 has a topology form.

First, the DC/DC converter 105 of FIG. 7A may supply the same DC voltage (about 300V) in parallel to the magnetic bearing controller 80 and the inverter controller 90 through two connection lines 701 and 702. For example, the DC/DC converter 105 may include one full-bridge circuit 710 and one FRD (fast recovery diode) circuit 720.

The DC/DC converter 105 may must additionally include a plurality of separate SMPSs (combination AC/DC and DC/DC) to generate control power for each of the magnetic bearing controller 80 and the inverter controller 90. The plurality of SMPSs having an insulation structure may supply control power to the magnetic bearing controller 80 and the inverter controller 90 through power lines 701 and 702 branched in parallel.

The DC/DC converter 105 of FIG. 7B may include one full-bridge circuit 710 and two FRD circuits 720a and 720b, and the FRD circuits 720a and 720b may be connected in parallel with each other. The first FRD circuit 720a may be connected to the magnetic bearing controller 80 and the second FRD circuit 720b may be connected to the inverter controller 90.

The DC/DC converter 105 of FIG. 7B may supply a high DC voltage (about 300V) to the magnetic bearing controller 80, and supply an additionally-insulated low DC voltage (+24V) to the inverter controller 90. At this time, the magnetic bearing controller 80 may need an SMPS for generating control power. Since the inverter controller 90 already has the insulation structure, the control power can be generated only by a regulator circuit.

The DC/DC converter 105 of FIG. 7C may have a structure in which the second FRD circuit 720b is connected to both the magnetic bearing controller 80 and the inverter controller 90 through power lines 703 and 704 of the second FRD circuit 720b that are additionally provided in the circuit structure of FIG. 7B. Other parts in the circuit structure of FIG. 7C may be the same as those in the circuit structure of the DC/DC converter 105 of FIG. 7B.

The DC/DC converter 105 of FIG. 7C may supply a high DC voltage (about 300V) only to a 'power circuit (or power line)' of the magnetic bearing controller 80. The DC/DC converter 105 of FIG. 7C may supply an additional-insulated low DC voltage (+24V) to control circuits (control lines) of the magnetic bearing controller 80 and the inverter controller 90.

Although the DC/DC converter 105 of FIG. 7C may be more complex than the circuit structures of FIGS. 7A and 7B, an insulation power structure for separating the control circuit (line) and the power circuit (line) from each other can be designed, and control power can be generated only by a regulator circuit design even without a plurality of SMPSs.

The DC/DC converter 105, for example, the topologies in the structures of (a) and (b) of FIG. 7D have been configured as insulation topologies for responding to inputs in a wide range, in order to flexibly deal with an input voltage variation and regenerative voltage control of a large-capacity inverter in a magnetic bearing system without a UPS device. As an example, (a) of FIG. 7D illustrates an LLC resonant full-bridge DC/DC converter, and (b) of FIG. 7D illustrates a PSFB (phase-shift full-bridge) DC/DC converter.

Hereinafter, an overall operation of a magnetic bearing system of the magnetic transforming apparatus according to the present disclosure will be described again with reference to FIG. 8.

Figure 8:
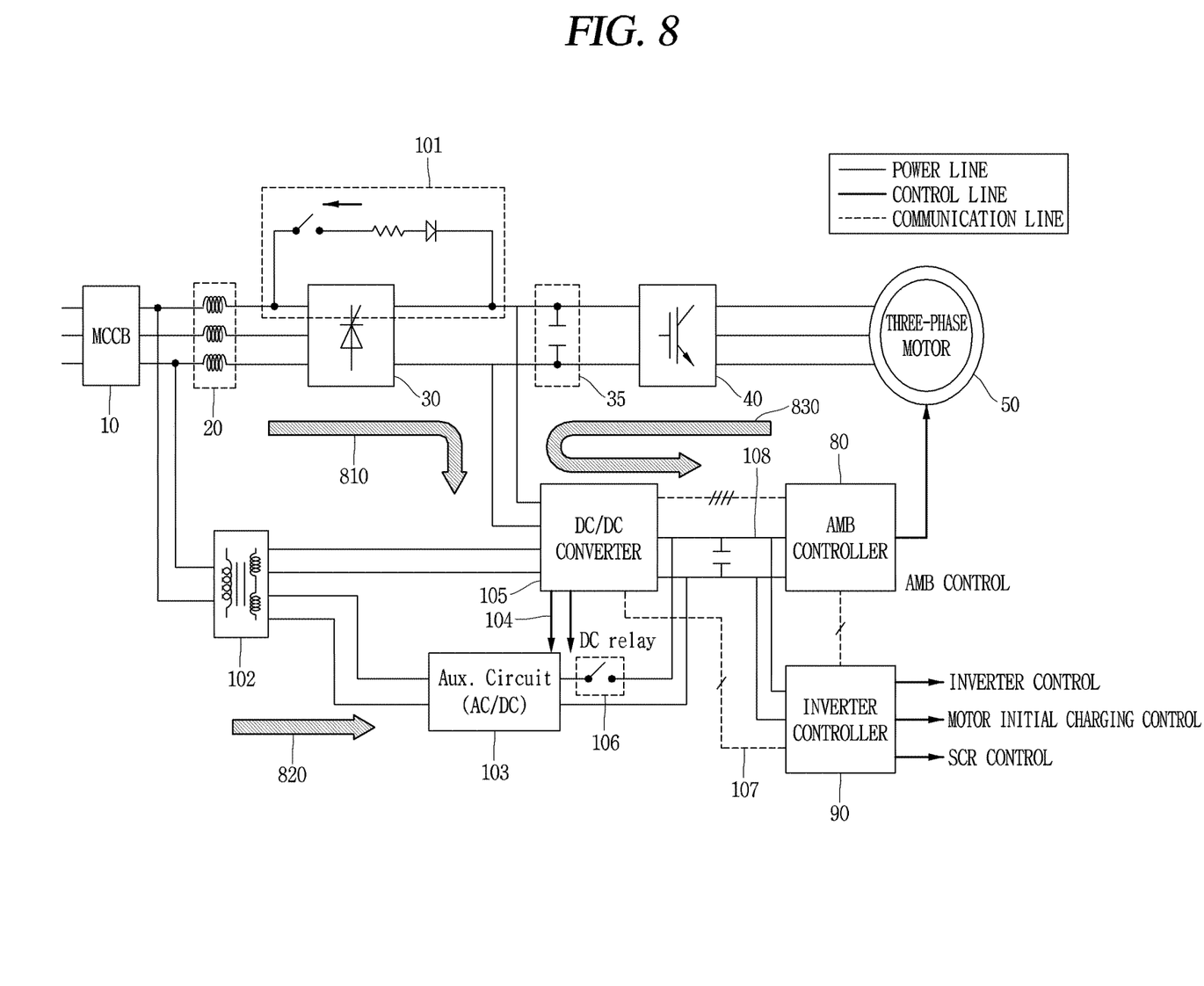
FIG. 8 is an exemplary circuit diagram illustrating an overall operation of a magnetic bearing system of a power transforming apparatus according to the present disclosure.

In FIG. 8, a first control flow 820 may correspond to a control flow of an operation executed upon an initial operation and a fault of a converter.

Upon the initial operation, a three-phase AC voltage may be supplied as control power to the DC/DC converter 105 through the step-down transformer 102. The initial control power supplied to the DC/DC converter 105 may then be supplied to the auxiliary circuit 103. Such power may be supplied to the magnetic bearing controller 80 and the inverter controller 90. When power is supplied to the inverter controller 90, an initial charging operation of the inverter may be started.

Also, even when a fault of the converter occurs, power may be supplied to the magnetic bearing controller 80 and the inverter controller 90 through the auxiliary circuit 103, instead of the DC/DC converter 105, along the first control flow 820. To this end, the DC relay 106 may be switched from an OFF state back to an ON state.

In FIG. 8, a second control flow 810 may indicate a control flow during a normal operation.

During the normal operation, a DC voltage charged in the DC link capacitor of the inverter may be supplied to the magnetic bearing controller 80 and the inverter controller 90 through the DC/DC converter 105 due to a difference between a voltage (about 220V) of the DC/DC converter 105 and a voltage (about 380V) of the inverter 40.

In FIG. 8, a third control flow 830 may indicate a control flow upon a power failure. When a power failure signal is detected in the DC/DC converter 105, the DC/DC converter 105 may transmit the power failure detection signal to the magnetic bearing controller 80 and the inverter controller 90, and control the relay of the inverter controller 90 to be turned off.

In addition, the inverter controller 90 may block the thyristor (SCR) of the three-phase rectifier 30. When a reverse rotation of the motor starts after the compressor stops due to cutting off a power output to the inverter, the inverter may be operated by switching a control mode of the inverter from a speed control mode to a voltage control mode.

The switching of the control mode of the three-phase inverter 40 may be carried out at the moment when the motor rotates in reverse. When the control mode of the inverter is switched to the voltage control mode, a regenerative constant voltage control may be performed so as to enable a stable power supply that meets the input spec of the DC/DC converter 105.

As described above, in a power transforming apparatus including a magnetic bearing-applied motor and an air conditioner including the same according to at least one of implementations of the present disclosure, an effective response to a power failure can be allowed by applying regenerative stepping up and a DC/DC converter without an additional UPS device.

The present disclosure may have an advantage in that it is unnecessary to implement a separate power failure detection circuit for regenerative control or an additional circuit for regeneration without adding a UPS device. Furthermore, an accurate regenerative constant voltage control can be performed even without an additional circuit for regeneration.

The present disclosure can improve reactive power due to a lowered power factor of a magnetic bearing AC control power supply. Specifically, by supplying power in a DC form through a DC/DC converter, only active power can be supplied.

Also, in the power transforming apparatus including the magnetic bearing-applied motor and the air conditioner including the same according to the present disclosure, since the UPS device can be excluded, battery replacement costs cannot be required and even an external application can be allowed.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

Features, structures, effects, and the like described in those implementations are included in at least one implementation of the present disclosure, and are not necessarily limited to only one implementation. Furthermore, features, structures, effects, and the like illustrated in each implementation may be combined or modified with respect to other implementations by those skilled in the art to which the implementations belong. Therefore, contents related to such combinations and modifications should be construed as being included in the scope of the present disclosure.

In addition, the foregoing description has been made with reference to the implementations, but it is merely illustrative and is not intended to limit the present disclosure. It will be apparent that other changes and applications can be made by those skilled in the art to which the present disclosure belong without departing from substantial features of the implementations of the present disclosure. For example, each component specifically shown in the implementations can be modified and practiced. And it should be construed that differences relating to such changes and applications are included in the scope of the present disclosure defined in the appended claims.

What is claimed is:

1. A power transforming apparatus for supplying power to a motor having a magnetic bearing, the apparatus comprising:
   an inverter;
   a converter configured to, in an initial operation, receive alternating-current (AC) power; and
   an auxiliary circuit that is configured to perform initial charging by rectifying the AC power to a second power and that is configured to supply the rectified second power to an inverter controller and a magnetic bearing controller,
   wherein the inverter controller is configured to output a driving signal to the inverter using the second power and control the inverter to supply a rectified direct-current (DC) voltage to the converter,
   wherein the converter is configured to, during a normal operation, (i) stop supplying the second power to the inverter controller and (ii) control the rectified DC voltage to be supplied to the inverter controller and the magnetic bearing controller, and
   wherein the converter is configured to, based on a power failure being detected by the converter, output a control signal such that the second power from the auxiliary circuit is supplied to the inverter controller and the magnetic bearing controller.

2. The apparatus of claim 1, further comprising a step-down transformer that is configured to step down a three-phase input voltage and that is configured to supply the stepped down voltage to the converter and the auxiliary circuit.

3. The apparatus of claim 2, wherein the step-down transformer is connected to the converter and the auxiliary circuit through power lines.

4. The apparatus of claim 3, wherein the step-down transformer is configured to, in the initial operation, supply a stepped-down AC voltage to (i) the converter through a first branch line and (ii) the auxiliary circuit through a second branch line.

5. The apparatus of claim 3, wherein the step-down transformer comprises a circuit structure in which an output voltage ratio of 380V that is a voltage of the inverter to 220V that is a voltage of the converter satisfies at least a voltage ratio of 2 to 1.

6. The apparatus of claim 1, further comprising a relay that is located between the converter and the auxiliary circuit,
wherein the converter is configured to turn on or off the relay.

7. The apparatus of claim 6, wherein the converter is configured to, during the normal operation, turn off the relay to stop supplying the second power and is configured to, based on the power failure being detected, output a control signal to turn on the relay to supply the second power.

8. The apparatus of claim 1, wherein the converter is configured to detect the power failure and transmit a power failure detection signal to the inverter controller and the magnetic bearing controller.

9. The apparatus of claim 8, wherein the inverter controller is configured to, based on the power failure detection signal being received, block a thyristor (SCR) of a rectifier that is connected to the inverter.

10. The apparatus of claim 9, wherein the inverter controller is configured to, based on a reverse rotation of the motor being started after receiving the power failure detection signal, switch a control mode of the inverter from a speed control mode into a voltage control mode.

11. The apparatus of claim 10, wherein the rectifier is configured to, during the normal operation, control the initial charging and a power factor of an AC input voltage of the inverter.

12. The apparatus of claim 10, wherein the rectifier is configured to, based on the inverter controller blocking the SCR, suppress a regenerative reverse voltage.

13. The apparatus of claim 1, wherein the magnetic bearing controller is configured to, based on the power failure being detected, perform a magnetic bearing gap control by receiving the second power from the auxiliary circuit and applying a current to the magnetic bearing of the motor.

14. The apparatus of claim 13, wherein the magnetic bearing controller is configured to, during the normal operation, perform the magnetic bearing gap control using the rectified DC voltage supplied from the converter.

15. The apparatus of claim 1, wherein the converter is configured to, based on a converter fault signal being detected, (i) change an output thereof into an OFF state and (ii) generate control power for the inverter controller and the magnetic bearing controller by receiving the second power from the auxiliary circuit.

16. An air conditioner comprising:
a power transforming apparatus comprising:
an inverter;
a converter configured to, in an initial operation, receive alternating-current (AC) power; and
an auxiliary circuit that is configured to perform initial charging by rectifying the AC power to a second power and that is configured to supply the rectified second power to an inverter controller and a magnetic bearing controller,
wherein the inverter controller is configured to output a driving signal to the inverter using the second power and control the inverter to supply a rectified direct-current (DC) voltage to the converter,
wherein the converter is configured to, during a normal operation, (i) stop supplying the second power to the inverter controller and (ii) control the rectified DC voltage to be supplied to the inverter controller and the magnetic bearing controller, and
wherein the converter is configured to, based on a power failure being detected by the converter, output a control signal such that the second power from the auxiliary circuit is supplied to the inverter controller and the magnetic bearing controller.

17. The air conditioner of claim 16, wherein the power transforming apparatus further comprises a step-down transformer that is configured to step down a three-phase input voltage and that is configured to supply the stepped down voltage to the converter and the auxiliary circuit.

18. The air conditioner of claim 17, wherein the step-down transformer is connected to the converter and the auxiliary circuit through power lines.

19. The air conditioner of claim 18, wherein the step-down transformer is configured to, in the initial operation, supply a stepped-down AC voltage to (i) the converter through a first branch line and (ii) the auxiliary circuit through a second branch line.

20. The air conditioner of claim 18, wherein the step-down transformer comprises a circuit structure in which an output voltage ratio of 380V that is a voltage of the inverter to 220V that is a voltage of the converter satisfies a voltage ratio of at least 2 to 1.

* * * * *